United States Patent [19]

Arocha

[11] Patent Number: 4,995,862
[45] Date of Patent: Feb. 26, 1991

[54] INTERAXLE TRANSFER MECHANISM FOR FOUR WHEEL DRIVE VEHICLES

[76] Inventor: Henry F. Arocha, 6603 Orion Ave., Van Nuys, Calif. 91406

[21] Appl. No.: 396,295

[22] Filed: Aug. 21, 1989

[51] Int. Cl.$^5$ .................. F16H 1/44.5; F16H 1/42
[52] U.S. Cl. .................. 475/86; 74/665 T; 180/233
[58] Field of Search .................. 180/233, 247, 248; 74/665 T; 475/221, 223, 198, 204, 317, 321

[56] References Cited

U.S. PATENT DOCUMENTS

| | | | |
|---|---|---|---|
| 3,963,085 | 6/1976 | Vinton | 475/221 X |
| 4,691,593 | 9/1987 | Mueller | 475/221 X |
| 4,718,301 | 1/1988 | Friderich | 475/221 X |
| 4,729,259 | 3/1988 | Lanzer | 475/221 X |
| 4,779,487 | 10/1988 | Pitsch et al. | 475/221 X |
| 4,787,269 | 11/1988 | Matsumoto | 475/221 X |
| 4,846,298 | 7/1989 | Naito | 180/233 |

FOREIGN PATENT DOCUMENTS 3616236 6/1987 Fed. Rep. of Germany ...... 180/233

Primary Examiner—Dwight Diehl
Attorney, Agent, or Firm—J. E. McTaggart

[57] ABSTRACT

For a part time four wheel drive vehicle, auxiliary drive power is handled by an interaxle transfer mechanism comprising a braked differential gear set interposed in the vehicle's auxiliary motive power path, providing, in addition to the normal two wheel drive mode and front-rear-locked four wheel drive mode, a limited-slip-auxiliary four wheel drive mode. The differential gear set may be of the planetary or bevel gear type; its reaction gear is coupled to a braking unit, preferably of the hydraulic disk-pad-caliper type which is readily accessible and highly serviceable. The transfer mechanism is typically interposed concentrically at the driven end of the vehicle's auxiliary driveshaft, and may be retrofitted onto existing vehicles of the type having a gear or chain driven offset auxiliary driveshaft by adding an extension gear casing which carries the braking unit externally. To maintain a 1:1 through ratio for retrofitting existing vehicles, a complementary gear ratio may be provided, for example by a second differential gear set, with its reaction gear locked, interposed concentrically in tandem with the braked differential gear set. A control panel and controller module provide driver selection of at least the three basic modes and may be made programmable to provide selected automatic capabilities such as release from locked four wheel drive above a predetermined steering angle, temporary locked four wheel drive kick-in upon loss of traction as sensed by a tachometer monitoring rotation of the transfer braking unit rotor, and release to two wheel drive whenever operation of the vehicle's anti-lock wheel braking system is sensed. The driver may be provided with an adjustable control to regulate the slippage in the limited slip mode. Two braked differential transfer units may be provided in a vehicle, one acting on the front wheels and the other acting on the rear wheels, to provide ultimate flexibility in five different drive modes: two wheel front, two wheel rear, four wheel front-rear-locked, four wheel main-front/limited-slip-rear, and four wheel main-rear/limited-slip-front.

9 Claims, 5 Drawing Sheets

INTERAXLE TRANSFER MECHANISM FOR FOUR WHEEL DRIVE VEHICLES

FIELD OF THE INVENTION

This invention relates, in the automotive field, to interaxle drive transfer mechanisms and related control apparatus for vehicles of the part time four wheel drive type.

BACKGROUND OF THE INVENTION

Four wheel drive has become increasingly popular in automobiles as well as utility and recreational vehicles because of performance advantages such as increased traction and enhanced handling compared to conventional two wheel drive, particularly under adverse driving conditions.

In a front-rear-locked four wheel drive mode, with a fixed drive ratio of 1:1 between the front and rear axles, traction would be superior to that of two wheel drive because nominally the drive power would be distributed equally amongst all four wheels. However this holds true only under ideal conditions, such as straight line travel and closely matched wheel diameters: under real driving conditions this ideal is rarely realized. Front-rear-lock has proven impractical and unsatisfactory for many normal driving conditions, mainly due to potential "wind up", i.e. uncontrolled interaxle power imbalances which can waste power and cause excessive tire wear from drag (a) during cornering due to the front-rear difference in wheel travel distance and rpm, and (b) in straight line travel due to differences in effective front-rear tire diameter.

These considerations have been addressed largely through two two general types of interaxle mechanisms, known as the center differential type and the "hang-on" type.

In the center (or intermediate) differential type neither axle is positively coupled to the engine: the driving torque is split differentially between the two axles, thus allowing interaxle slippage. This arrangement suffers from the disadvantage that when torque is lost at one axle, typically when traction is lost at one or both wheels of one axle, such as on mud, gravel or ice, and wheel spinning occurs, the loss of torque is equally reflected to the other axle with the result that even if the wheels of the second axle have good traction, full engine power for pulling the vehicle out of an immobile situation cannot be directed to the second axle. This problem has been addressed by such remedial measures as temporarily locking or overriding the center differential to temporarily revert to positive coupling of one or both axles in order to restore lost traction. Examples of center differential type four wheel drive systems are disclosed in U.S. Pat. No. 4,566,544 to Suzuki, No. 4,618,022 to Hayashi and No. 4,627,513 to Tutzer.

In the conventional "hang-on" type configuration, a main drive axle is positively coupled to the motive power source in the manner of a normal two wheel drive vehicle, while an auxiliary power path to the other axle through an interaxle transfer gearbox is made selectable so that the driver may choose between a two wheel drive mode and a front-rear-locked four wheel drive mode.

Four wheel drive systems may also be classified as either (a) part time four wheel drive wherein an auxiliary drive axle may be fully disengaged to revert to two wheel drive, or (b) full time four wheel drive, also known as all wheel drive, wherein all road wheels receive drive power continuously in some proportion, not necessarily equal. Full time four wheel drive is exemplified in U.S. Patents to Mueller: No. 4,691,593 in a single "hang-on" configuration utilizing a centrifugal clutch and 4,763,747 with dual hang-on transfer units, one associated with each rear wheel.

Efforts to attain satisfactory performance in full time four wheel drive under a variety of driving conditions has required development of complex and sophisticated automatic control systems to continuously proportion drive torque optimally amongst the road wheels in response to numerous vehicle operating parameters such as steering angle, vehicle speed, axle speed differences, throttle settings, charging air pressure and predicted drive wheel friction coefficients. Continuous four wheel drive control is disclosed by Stelter in U.S. Pat. No. 4,754,853 and No. 4,792,011.

Compared to full time four wheel drive systems, part time four wheel drive can generally be implemented with less complexity. In a basic conventional form, the auxiliary driveshaft is driven via a manually engaged dog clutch, which, if not of the synchronized type, may require the vehicle to be stopped for changeover. A more sophisticated automatic auxiliary drive transfer mechanism is exemplified in U.S. Pat. No. 4,567,061 to Yamakawa et al in which changeover between two wheel drive and front-rear-locked four wheel drive is implemented by means of a disengagement clutch in the auxiliary drive train under automatic control responsive to sensed vehicle speed and steering angle. Suzuki in U.S. Pat. No. 4,560,025 discloses a part time type four wheel drive system having automatic locking clutches at each of the two front wheels.

SUMMARY OF THE INVENTION

A primary object of the present invention is to provide, in the intended auxiliary train of a part time four wheel drive vehicle, a novel braked differential "hang-on" type interaxle transfer mechanism comprising a differential gear set combined with a braking unit, preferably of the disk-pad-caliper type, the rotor of the braking unit being rotationally coupled to the reaction gear element of the differential gear set.

It is a further object to provide a "hang-on" interaxle transfer mechanism capable of controlled slippage, so as to enable vehicle operation in a controllable-limited-slip-auxiliary four wheel drive mode, in addition to the conventional two wheel drive and a front-rear-locked four wheel drive modes.

It is a further object of this invention to provide a novel braked differential driveshaft power transfer mechanism in combination with driver-operable controlling means enabling a choice of operating modes including two wheel drive, front-rear-locked four wheel drive, and controllable-limited-slip-auxiliary four wheel drive.

A further object is to provide optional automatic mode changeover amongst the three abovementioned modes in response to vehicle operation parameters such as steering angle, front/rear slippage, and anti-lock wheel braking status.

A still further object is to provide the capability of after-market modification of a part time four wheel drive vehicle by interposing, in a driveshaft powering a front or rear axle, a transfer unit comprising a differential gear combined with a braking unit, thus enabling the vehicle to operate in a limited-slip-auxiliary four wheel drive mode.

It is a further object to configure a limited slip interaxle transfer mechanism of the hang-on type having a 1:1 ratio, capable of being retrofitted onto existing vehicles as an after-market accessory.

DETAILED DESCRIPTION

Figure 1:
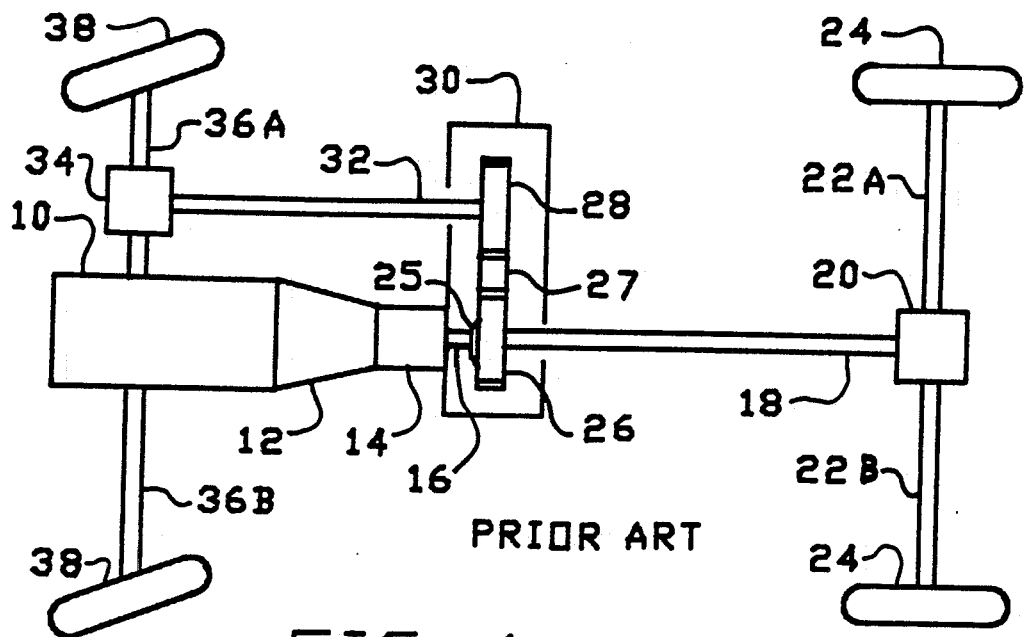
FIG. 1 is a functional block diagram of the motive system of a typical vehicle of the part time four wheel drive type of known art operable in a two wheel drive mode with motive power supplied to the rear wheels, and in a front-rear-locked four wheel drive mode, selectable by an interaxle transfer gearbox supplying disengageable auxiliary drive to the front wheels.

FIG. 1 represents in plan view the essential motive elements of a part time four wheel drive vehicle of known art having a front mounted engine 10, transmission 12 and gearbox 14 supplying motive power for the vehicle at a power driveshaft 16 which is directly coupled though a main drive train comprising main driveshaft 18, rear axle differential 20 and rear axle segments 22A and 22B to rear wheels 24. In an auxiliary drive train, gear 26, which is coupled to power driveshaft 16 through a disengageable coupling mechanism 25, engages idler gear 27 which in turn engages gear 28. Gears 26, 27 and 28 are enclosed in transfer gear housing 30. Gear 28 is affixed to auxiliary driveshaft 32 in the auxiliary drive train power path through front axle differential 34 and front axle segments 36A and 36B to front wheels 38. Whenever the vehicle driver engages mechanism 25 to rotationally lock gear 26 to driveshaft 16, drive power is transmitted through the auxiliary power path to the front wheels 38 as well as the main power path to the rear wheels 24 so that the vehicle operates in a front-rear-locked four wheel drive mode. Disengagement mechanism 25, which may a dog clutch of the synchronized or non-synchronized type, enables removal of motive power from the front wheels 38 for operation in a two wheel drive mode with motive power delivered only to rear wheels 24. As a design alternative, the function of gears 26, 27 and 28 may be realized in some vehicles of this type in the form of two sprockets coupled via a drive chain. Idler gear 27, which has no effect on the gear ratio, serves primarily to provide sufficient offset spacing of driveshaft 32.

Figure 2:
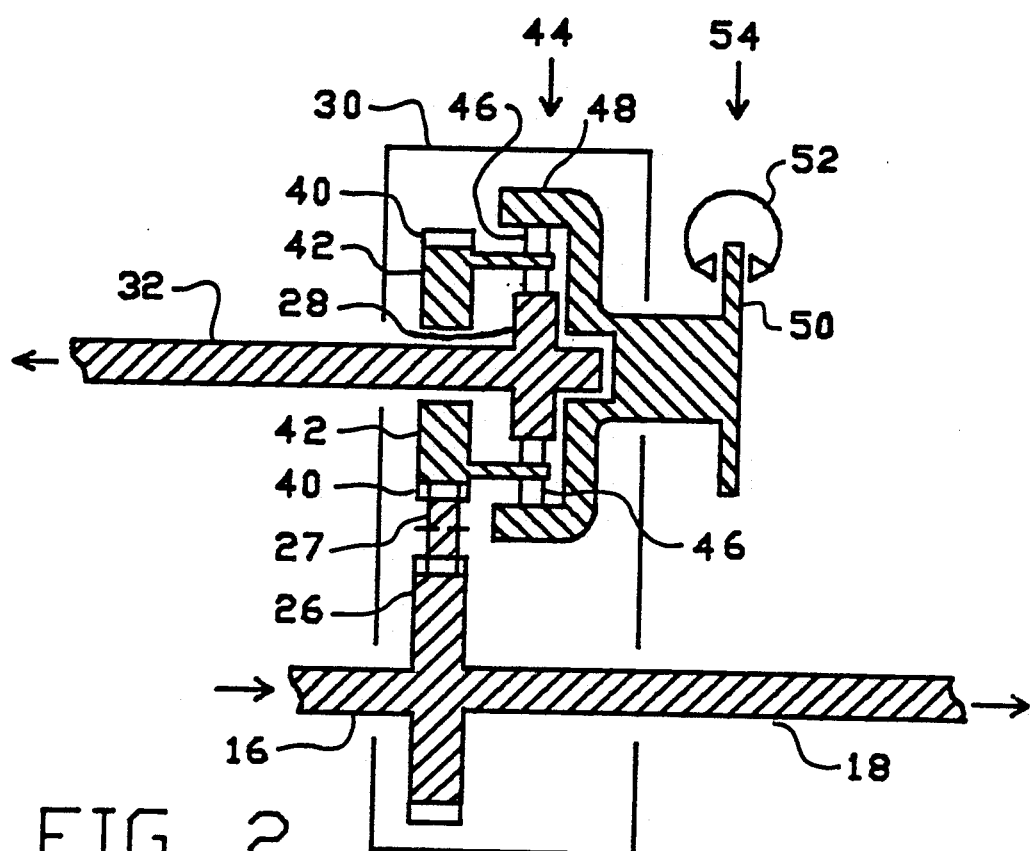
FIG. 2 is a cross-sectional functional representation of a planetary interaxle transfer mechanism of this invention enabling vehicles such as those of the type shown in FIG. 1 to operate in a limited-slip-auxiliary four wheel drive mode.

FIG. 2 is a functional cross-sectional diagram of a planetary interaxle transfer mechanism of this invention, which may be utilized in place of the transfer mechanism contained in housing 30 of FIG. 1 for providing the additional capability of a limited-slip-auxiliary four wheel drive mode. In FIG. 2, gear 26, affixed to driveshaft 16 (or engaged therewith through existing means such as mechanism 25 in FIG. 1), drives idler gear 27 which engages exterior circumferential gear teeth 40 to drive planet carrier gear element 42 of a planetary gear set 44 which further comprises planet gears 46 engaging sun gear 28, affixed to auxiliary driveshaft 32. Planet gears 46 also engage ring gear element 48 which is directly coupled to a brake disk 50 which, along with caliper brake pad assembly 52, forms a braking unit 54 disposed externally to transfer gear housing 30.

In operation, when the caliper unit 52 of braking unit 54 is activated to lock disk 50 against rotation, ring gear element 48, being the reaction gear element of the planetary gear set 44, also becomes locked against rotation, causing the power received by planet carrier element 42 to be transmitted via sun gear 28 to auxiliary driveshaft 32 and thence, as in FIG. 1, via axle differential 34 and axle segments 36A and 36B to the front wheels 38. Referring again to FIG. 2, the diameters of gear 26 and the gear elements of planetary gear set 44 are allocated such that the front and rear wheels will be driven at equal speed when the brake disk 50 is locked against rotation, so that the vehicle will operate in a front-rear-locked four wheel drive mode such that in straight ahead driving, motive power will nominally divide equally amongst all four wheels. However when braking constraint is removed from disk 50, no drive power will be transmitted to the front wheels via the planetary gear set 44 and driveshaft 32, so the vehicle will then operate in a two wheel drive mode with all motive power transmitted through driveshaft 18 to the rear wheels.

Unlike dog clutch type and other conventional clutch-switching two-four wheel transfer schemes, the transfer mechanism of this invention utilizing the combination of a differential gear set with braking device 54 at its reaction gear element as exemplified in FIG. 2, provides, in addition to two wheel drive mode and front-rear-locked four wheel drive, a third mode, i.e. a limited-slip-auxiliary four wheel drive mode, in which limited braking force applied to disk 50 causes a limited proportion (less than half) of the total drive power to be transmitted to the front wheels 38, while allowing front-rear slippage to relieve cornering "wind-up" and accomodate abnormal driving conditions. The front-rear proportion may be readily placed under control of the driver through regulation of the braking unit 54.

Clutches as utilized in conventional transfer mechanisms are typically of the dog type which are designed to operate only in a fully engaged or fully disengaged mode where no power dissipation is involved. Even the synchronized type is typically subject to operating limitations: for example, it is usual to restrict changeover to straight line driving and to a maximum allowable speed to avoid frictional heat damage. Clearly such clutches are incapable of operating in a controlled slippage mode because they would be quickly destroyed by the frictional heat generated; whereas the braking unit 54 of this invention, being inherently capable of continuously dissipating frictional braking power, enables operation in the controlled slippage mode.

A further advantage of the configuration of this invention is that it allows the braking unit 54 to be located external to the transfer gear housing 30 as seen in FIG. 2, providing excellent accessibility for inspection and service. The disk brake pads are readily replaceable and the disk may be made removable for remachining without major disassembly as required in overhauling an enclosed clutch configuration.

Figure 3:
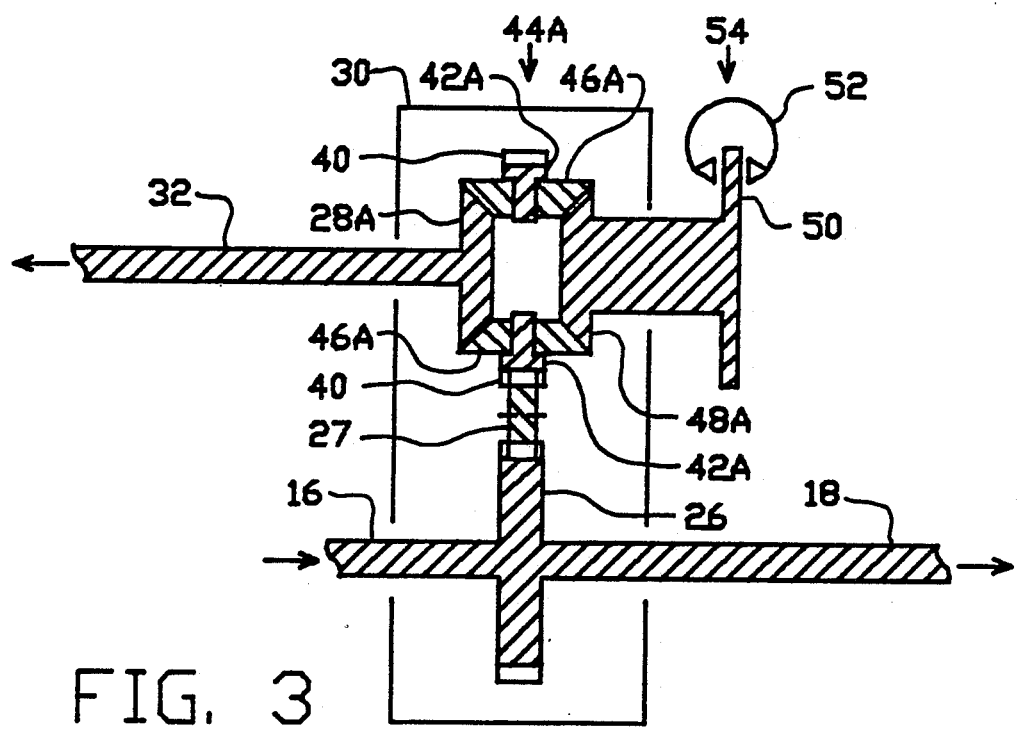
FIG. 3 is a cross-sectional functional diagram of an interaxle transfer mechanism similar to that of FIG. 2 except for the use of a bevel gear type differential configuration instead of a planetary type.

FIG. 3 shows a cross sectional functional diagram of a bevel gear type differential configuration which may be utilized in place of the planetary gear configuration of FIG. 2. In FIG. 3, carrier 42A (corresponding to planet carrier element 42 of FIG. 2 and similarly fitted with circumferential gear teeth 40 driven from gear 26 via idler gear 27), carries bevel pinions 46A (corresponding to planet pinions 46 of FIG. 2), which engage side bevel gear 28A (corresponding to sun gear element 28, in FIG. 2) affixed to auxiliary driveshaft 32. Pinions 46A also engage bevel side gear 48A (corresponding to ring gear element 48 of FIG. 2) which is directly coupled to brake disk 50 of braking unit 54 including caliper brake pad assembly 52. In this configuration, with brake disk 50 locked against rotation, the bevel type differential gear gear set 44A has a 1:2 step-up ratio from carrier 42A to bevel side gear 28A, therefore a 2:1 step-down ratio could be realized by making the diameter of carrier 42A twice that of gear 26, in order to cancel the 1:2 differential gear set ratio and thus provide equal front-rear wheel speed (assuming equal gear ratios in axle differentials 20 and 34, FIG. 1). Idler gear 27 may not be required, depending on physical spacing required between driveshafts 32 and 18 and their relative directions of rotation as dictated by the axle differentials.

Figure 4:
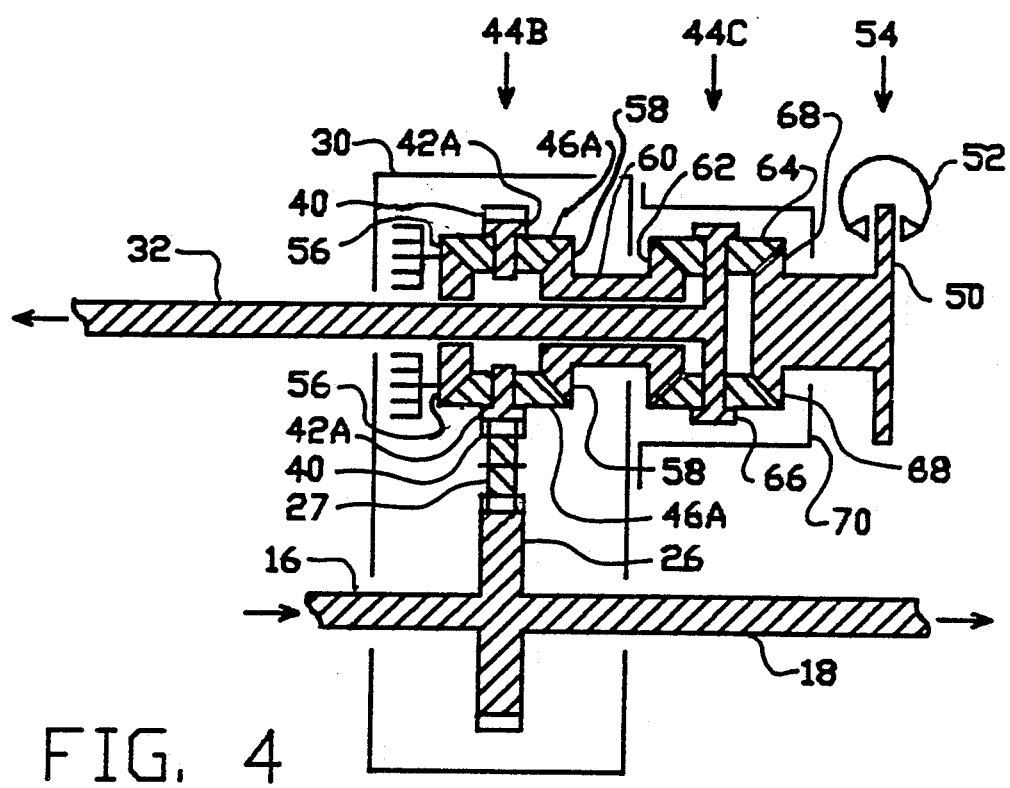
FIG. 4 is a cross-sectional functional diagram of an view of an interaxle transfer mechanism utilizing two differential gear sets and a disk braking unit in accordance with this invention in an embodiment providing a 1:1 ratio, suitable for modifying an existing transfer gearbox of a part time four wheel drive vehicle so as to introduce a limited-slip-auxiliary four wheel drive mode.

FIG. 4 is a cross sectional functional diagram of a transfer mechanism comprising two bevel gear type differential gear sets and a disk braking unit in accordance with this invention in an embodiment which is capable of being incorporated as a modification to an existing vehicle transfer mechanism to provide the additional capability of operating in a limited-slip-auxiliary four wheel drive mode in addition to the originally provided capabilities of two wheel drive mode and front-rear-locked four wheel drive mode.

Engine power is received through input driveshaft 16 which is coupled directly to main driveshaft 18 (the same as in FIGS. 1-3). Gear 26, driven by driveshaft 16, (either affixed as shown or else driven through a disengagement mechanism which would be left in a permanently engaged mode) is rotationally coupled, either through idler gear 27 or directly, to gear teeth 40 surrounding carrier gear element 42A of differential gear set 44B, wherein bevel pinions 46A engage a first bevel side gear 56 which is constrained against rotation and a second bevel side gear 58 which is coupled though a hollow shaft 60 to bevel side gear 62 of a second differential gear set 44C. Bevel side gear 62 engages pinions 64 of carrier 66 which is affixed to auxiliary driveshaft 32. Surrounding this input end region of driveshaft 32 are side gears 56, 58 and 62 and hollow shaft 60. Pinions 64 also engage side bevel gear 68 which is coupled directly to brake disk 50 of braking unit 54 which includes caliper pad assembly 52. The second differential gear set 44C is enclosed in an additional casing 70 attached onto the original transfer housing 30, leaving the braking unit 54 exposed as shown.

In operation of the transfer mechanism of FIG. 4, motive power is transmitted from driveshaft 16 via gear 26 to carrier 42A of the first differential gear set 44B, where side gear 56, being the reaction gear element and being locked against rotation, causes power to be transmitted via side gear 58 and hollow shaft 60 to side gear 62 of the second differential gear set 44C. When side gear 68, the reaction gear element of the second differential gear set 44C, is locked against rotation by braking action of disk 50, power from the side gear 62 is transmitted through carrier 66 to auxiliary driveshaft 32, thence to the vehicle's auxiliary drive wheels (for example the front wheels 38 in FIG. 1). A 1:2 rotational speed step-up through the first differential gear set 44B is canceled by a 2:1 speed step-down through the second differential gear set 44C to provide a 1:1 through ratio so that front and rear wheels are driven at equal speeds as in the original configuration. As with FIGS. 2 and 3, releasing the braking constraint on disk 50 removes motive power from the auxiliary drive (e.g. front) wheels so the vehicle operates in a two wheel drive mode, and limited braking constraint on disk 50 introduces a limited-slip-auxiliary four wheel drive mode which was not available prior to incorporation of the present invention. In the case of vehicle models utilizing chain drive instead of gear drive in the transfer mechanism, carrier 42A would be fitted with sprocket teeth in place of gear teeth 40, and the original drive chain would be utilized.

Figure 5:
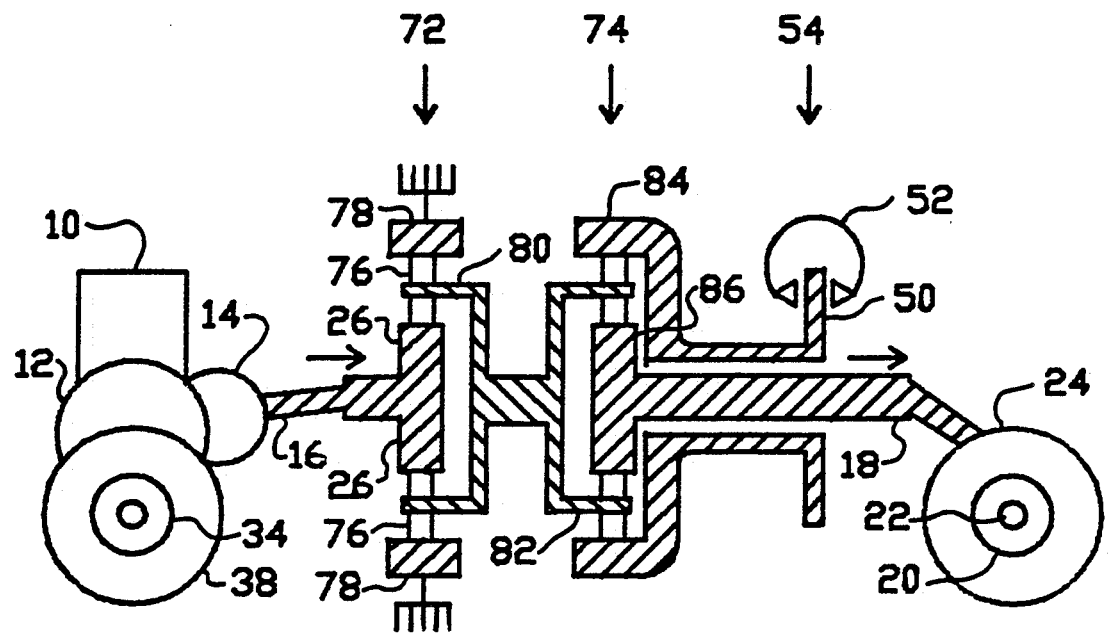
FIG. 5 is a cross-sectional functional diagram of a two/four wheel mode interaxle transfer mechanism having two planetary gear sets and a disk type braking unit in accordance with the present invention, in a vehicle having a front transversely mounted engine and a front transaxle main drive train.

FIG. 5 is a functional diagram showing in side elevation an embodiment of a transfer mechanism of this invention particularly directed to a vehicle of the part time four wheel drive type in which the auxiliary driveshaft 18 is disposed in substantially coaxial relationship with the main driveshaft 16, as for example with an engine 10 mounted as shown above a transaxle assembly including transmission 12 coupled to main drive wheels 38 and gearbox 14 which supplies auxiliary drive power at driveshaft 16. Prior to incorporation of the mechanism of the present invention, driveshaft 26 would have been directly coupled to auxiliary driveshaft 18, thence via rear axle differential 20 and axle segments 22 to auxiliary drive wheels 24.

The present invention is implemented in such a vehicle by interposing, between input driveshaft 16 and auxiliary driveshaft 18, as shown in FIG. 5, a differential interaxle transfer mechanism comprising a pair of planetary gear sets 72 and 74 wherein sun gear element 26 of planetary gear set 72 transmits motive power, received from input driveshaft 16, via planet pinions 76, engaging constrained ring gear element 78, to planet carrier 80, which is directly coupled to planet carrier 82 of planetary gear set 74 whose ring gear element 84 is directly coupled to brake disk 50, so that when braking is activated through caliper assembly 52 to lock ring gear element 84 against rotation, power becomes transmitted through sun gear 86, affixed to auxiliary driveshaft 18, thence through axle differential 20 and axle segments 22 to rear wheels 24. The rotational speed ratios of the two planetary gear sets 72 and 74 cancel each other to provide a 1:1 through ratio from driveshaft 16 to rear (auxiliary) driveshaft 18, so that in retrofitting an existing vehicle by interposing this transfer mechanism between driveshaft 16 and auxiliary driveshaft 18, a 1:1 front-rear wheel drive ratio is preserved.

Figure 6:
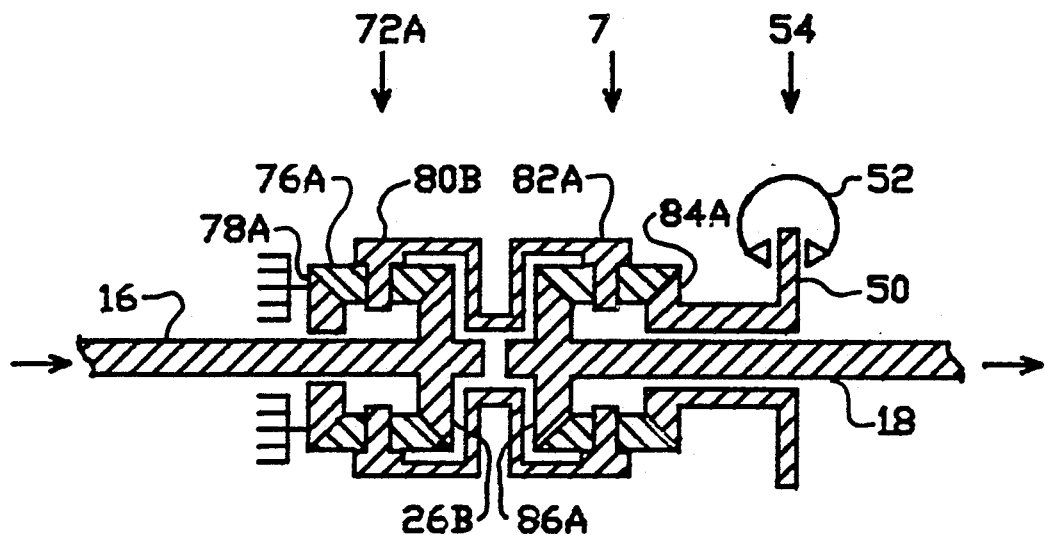
FIG. 6 is a cross-sectional functional diagram of a drive shaft control mechanism similar to FIG. 5 except for the use of a bevel gear type differential configuration instead of a planetary type.

FIG. 6 shows a differential gear configuration of the bevel gear type which is functionally and operationally equivalent to the planetary type shown in FIG. 5. In FIG. 6, constrained side gear 78A, pinions 76A, side gear 26B and carrier 80B of the differential gear set 72A correspond to (FIG. 5) constrained ring gear 78, planet gears 76, sun gear 26 and planet carrier 80 of planetary gear set 72 respectively. Similarly, in FIG. 6, carrier 82A, output side gear 86A and braked side gear 84A of differential gear set 74B correspond to (FIG. 5) planet carrier 82, output sun gear 86 and ring gear element 84 of planetary gear set 74 respectively.

Utilizing any of the embodiments shown in FIGS. 2-6, the proportion of total engine power reaching the auxiliary drive wheels may be controlled through regulating the applied braking force in braking unit 54 so as to provide three basic operating modes:

(1) two wheel drive mode, with no braking applied by braking unit 54 thus allowing disk 50 to rotate without constraint, (2) four wheel drive mode, with full braking applied by braking unit 54 thus locking the disk 50 against rotation, and (3) limited-slip-auxiliary 4 wheel drive mode, where partial braking applied by braking unit 54 allows limited rotation of disk 50 such that the auxiliary drive wheels receive a smaller proportion of the total motive power than the main drive wheels.

Figure 7:
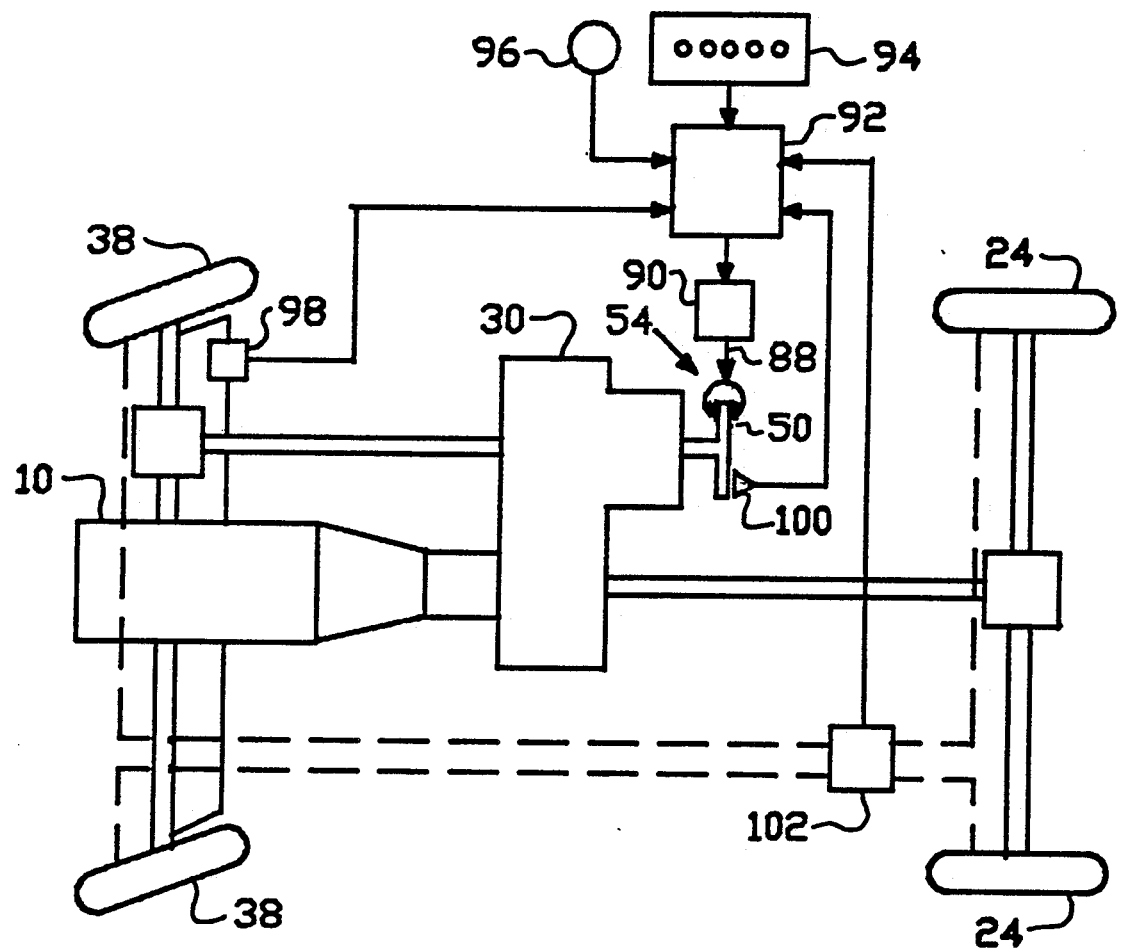
FIG. 7 is a functional block diagram of a control system in combination with an interaxle transfer mechanism of this invention as incorporated in the motive system of a vehicle of the type shown in FIG. 1.

FIG. 7 shows in plan view a block diagram of the basic drive and control elements of a vehicle having a controlling system applicable to the configurations described heretofore with reference to FIGS. 2-6. For illustrative purposes, FIG. 7 represents the general vehicle configuration of FIG. 1, with the transfer mechanism modified in accordance with the present invention as described with reference to FIGS. 2 and 3; however it should be apparent that such a controlling system is equally adaptable to other embodiments of the invention including those shown in FIGS. 4-6.

At the rear of transfer gear housing 30, the disk braking unit 54 receives fluid pressure through a hydraulic fluid line 88 from a master cylinder unit 90.

A control module 92, receiving as input driver instructions entered on a control panel 94, exerts control over master cylinder unit 90 at three levels: full pressure for full braking torque to lock disk 50 for front-rear-locked four wheel drive, reduced pressure for partial braking torque to allow limited slippage of disk 50 for limited-slip-auxiliary four wheel drive, and zero braking torque with disk 50 unconstrained for two wheel drive. The value of reduced pressure for limited slippage may be made adjustable by driver control 96, which may be a knob.

Control panel 94 and module 92 preferably permit selection of one or more automatic modes. A steering angle sensor 98, linked to the steering linkage of the front wheels 38, provides module 92 with an indication whenever the steering angle exceeds a predetermined value, whereupon, if the vehicle is in a locked four wheel drive mode (and the steering angle sensing feature has been selected at panel 94 by the driver), module 92 immediately commands a mode changeover to limited-slip-auxiliary four wheel drive by reducing the braking pressure in braking unit 54 to a level which may be set by control 96, thus reducing drag and tire wear due to cornering. As a refinement, sensor 98 could be made to operate in a fully proportional servo mode.

To sense loss of wheel traction, a tachometer sensor 100, monitoring brake disk 50, provides module 92 with disk rotation speed data. In locked four wheel drive mode, disk 50 remains locked so tachometer sensor 100 will register zero; however, when disk 50 rotates, the speed of rotation indicates the difference between the rotational speeds of main (e.g. rear) driveshaft 32 and auxiliary (e.g. front) driveshaft 18, as will occur for example whenever the vehicle loses traction at the main drive wheels. Under these conditions (if this feature has been selected at panel 94 by the driver), whenever slippage as indicated by rotation of disk 50 exceeds a predetermined rpm value, module 92 will automatically lock into four wheel drive mode by locking disk 50 for a designated period of time, then revert to the prior mode, ready to repeat the cycle if traction has not been recovered at the main drive wheels.

If the vehicle is equipped with an ABS (anti-lock wheel braking system), status data from the ABS control unit 102 may be provided as input to module 92 to provide an automatic mode to override a four wheel drive mode and revert to two wheel drive whenever the ABS is operative, thus avoiding impairment of the ABS function.

Figure 8:
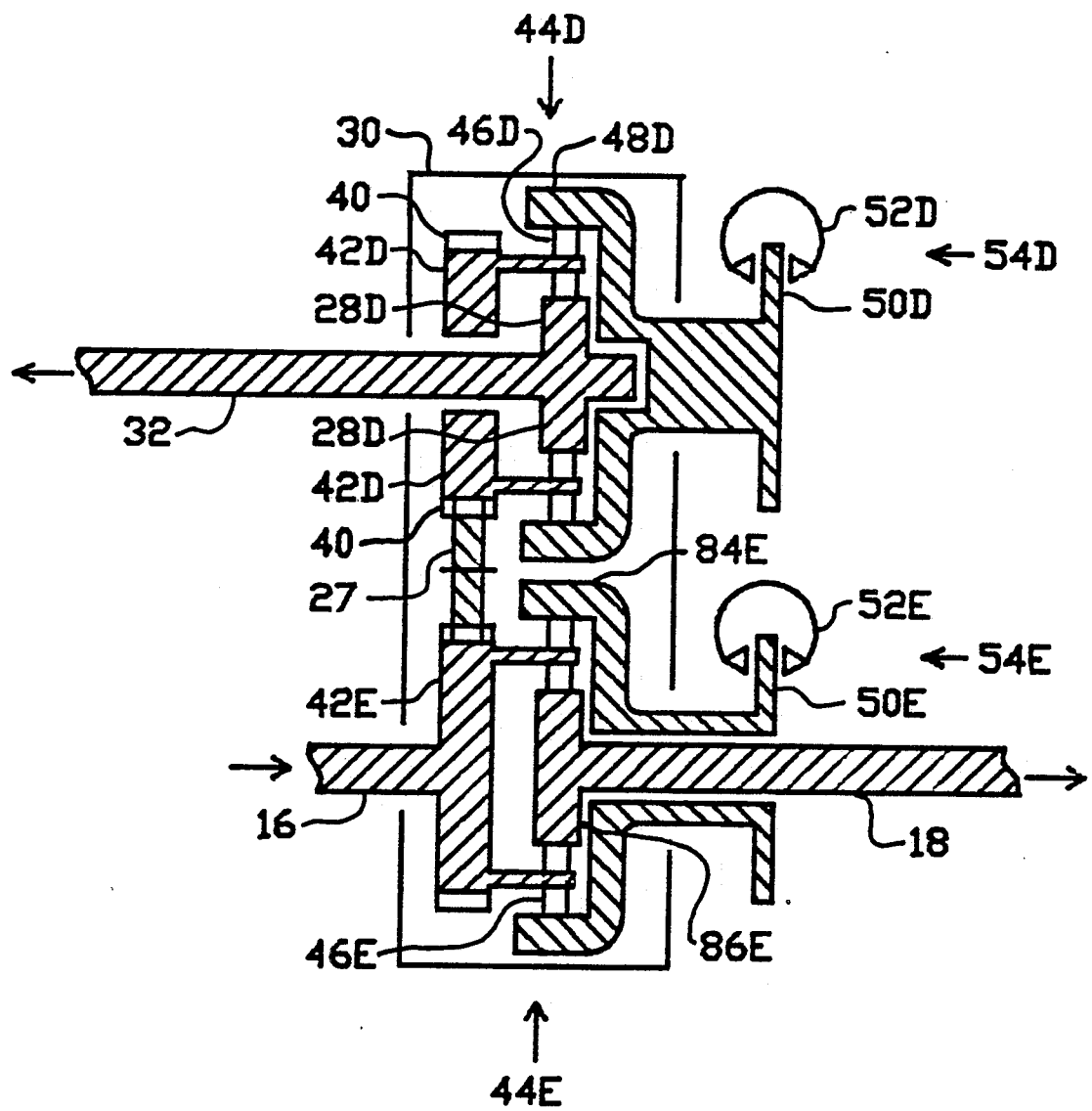
FIG. 8 is a cross-sectional functional block diagram of a drive shaft control mechanism of this invention having two braked-reaction planetary gear sets providing five basic drive modes: two wheel/front, two wheel/rear, four wheel/front-rear-lock, four wheel/main front/limited-slip rear, and four wheel/main rear/limited-slip front.

FIG. 8 illustrates, in a cross sectional functional diagram, an interaxle transfer mechanism providing the ultimate two/four wheel drive flexibility of five basic selectable modes: two wheel front, two wheel rear, four wheel front-rear locked, four wheel front main/rear limited slip, and four wheel rear main/front limited slip. Two braked differential mechanisms, of an above-disclosed type, are interposed one in the front wheel driveshaft and the other in the rear wheel driveshaft of the vehicle. For example, as shown in FIG. 8, a first planetary gear set 44D, braked by braking unit 54D, controls motive power transfer to the front driveshaft 32 while a second planetary gear set 44E, braked by braking unit 54E, controls motive power transfer to the rear driveshaft 18. Elements 28D, 42D, 40D, 46D, 48D, 50D and 52D of FIG. 8 correspond functionally with with like numbered elements of FIG. 2, while elements 84E, 52E, 50E and 86E of FIG. 8 correspond functionally with like numbered elements of FIG. 5. In FIG. 8, planet carrier element 42E of planetary gear set 44E, carrying planet pinions 46E, is affixed (or selectably coupled) to driveshaft 16 which delivers engine power. An equivalent dual braking transfer unit could be implemented utilizing bevel type differential gear sets instead of planetaries by augmenting the mechanism of FIG. 4 with a second bevel differential gear set and braking unit such as 72B and 54 of FIG. 6, interposed in series with rear driveshaft 18.

Suitable control of the two braking units of FIG. 8 is readily implemented in a control system such as that shown in FIG. 7 through known programming techniques, to provide any of the five stated basic drive modes, along with various subcombinations of automatic modes as disclosed in connection with FIG. 7.

In any of the aforementioned embodiments, a control system such as that of FIG. 7 may be adapted to control the braking unit(s) in accordance with other sensed parameters regarding vehicle operation status such as vehicle speed.

Braking unit 54 may alternatively be of the conventional automotive drum type having a pair of brake shoes acting on a drum rotor element in place of caliper assembly 52 and disk 50. The techniques of electrically interfacing module 92 to a hydraulic braking unit of the disk or drum type are standard and well known to those in the automotive arts.

There are also options of operating braking unit(s) 54 mechanically and/or electrically; however, the hydraulic disk type is considered preferable: the ease of inspection and maintenance, particularly regarding inspection and replacement of brake pads is an important advantage over prior art having clutch means located inaccessably within enclosed or sealed housings. In addition, the disk type offers the possibility of utilizing more than one caliper unit on a single disk rotor, in order to benefit or facilitate the design of the control system as a mechanical "or" gate.

Module 92 may be implemented in standard hard-wired electronic logic or it may be microcomputer based to permit flexibility in developing and implementing various control algorithms through standard software and/or firmware programming as practiced routinely by those in the electronics arts.

The particular combinations of configuration options such as front/rear transverse/longitudinal engine locations and front/rear main drive chosen for illustrative purposes should not be considered restrictive: the principle of this invention is readily applied to other combinations and vehicle configurations. The invention may also be practiced successfully with gear ratios other than the 1:1 input/output ratio, which is preferred for its utility in instances of after-market modifications to vehicles already in service, and for the possibility of facilitating redesign efforts. Since the sole function of an additional locked-reactor differential set shown in FIGS. 4-6 is to achieve a 1:1 main/auxiliary driveshaft ratio, it would be obvious in new vehicle design to eliminate the need for the additional locked-reactor differential set by compensating elsewhere, for example by allocating different driveshaft-to-axle ratios for the front and rear wheels.

The invention may be embodied in still other specific forms without departing from the spirit and essential characteristics thereof. The present embodiments are therefore to be considered in all respects as illustrative and not restrictive, the scope of the invention being indicated by the appended claims rather than by the foregoing description; and all variations, substitutions and changes which come within the meaning and range of equivalency of the claims are therefore intended to be embraced therein.

What is claimed is:

1. An interaxle drive transfer mechanism, interposed in an auxiliary motive power path between an engine and an auxiliary driveshaft of a part time four wheel drive vehicle, comprising:
   a primary differential gear set having a first gear element rotationally coupled to a power driveshaft receiving motive power from the engine, a second gear element rotationally coupled to the auxiliary driveshaft, and a third gear element;
   a braking unit having a rotor rotationally coupled to the third gear element; and
   controlling means adapted to select one from at least the following three levels of braking torque and corresponding vehicle drive modes: (1) full braking torque, locking the rotor so as to provide a four wheel front-rear-locked four wheel drive mode, (2) partial braking torque, allowing limited rotor slippage so as to provide a limited-slippage-auxiliary four wheel drive mode, and (3) zero braking torque, allowing free rotor rotation so as to prevent drive power from reaching the auxiliary driveshaft and to thus provide a two wheel drive mode.

2. The interaxle drive transfer mechanism as defined in claim 1 wherein said braking unit comprises a disk type rotor and a co-operating set of brake pads in a hydraulically operated brake caliper assembly.

3. The interaxle drive transfer mechanism as defined in claim 1 wherein said braking unit comprises a drum type rotor and a co-operating set of brake shoes operative from a hydraulic cylinder.

4. The interaxle drive transfer mechanism as defined in claim 1 wherein said primary differential gear set is configured as a planetary gear set.

5. The interaxle drive transfer mechanism as defined in claim 4 wherein, in said planetary gear set:
   said first gear element comprises a planet carrier gear element carrying a plurality of planet pinions,
   said second gear element comprises a sun gear element, rotationally coupled to the auxiliary driveshaft, engaging the planet pinions, and
   said third gear element comprises an internal-tooth ring gear element engaging the planet pinions.

6. The interaxle drive transfer mechanism as defined in claim 5 further comprising rotational gear ratio means interposed in tandem with said planetary gear set in the auxiliary motive power path, said rotational ratio means providing a rotational ratio reciprocal to that of said primary differential gear set so as to provide a rotational through ratio of 1:1 between the power driveshaft and the auxiliary driveshaft.

7. The interaxle drive transfer mechanism as defined in claim 6 wherein the auxiliary driveshaft is disposed offset from the power driveshaft, and said gear ratio means comprises a gear, disposed concentrically around the power driveshaft and drivingly coupled thereto, said gear being rotationally coupled to an external tooth ring gear disposed circumferentially around said planet carrier.

8. An interaxle drive transfer mechanism in a vehicle of the part time four wheel drive type having a full time motive power path from an engine through a main driveshaft to a pair of primary drive wheels and a part time motive power path through an auxiliary driveshaft to a pair of auxiliary drive wheels, said transfer mechanism comprising:
   a differential gear set having a first gear element rotationally coupled to a power driveshaft receiving motive power from the engine, a second gear element rotationally coupled to said auxiliary driveshaft, and a third gear element, the relative diameters of the gear elements being made such that straight line travel of the vehicle produces nominally zero rotation of the third gear element;
   a braking unit having a rotor rotationally coupled to said third gear element; and controlling means adapted to enable selection of any one of the following operating modes while driving the vehicle: (a) a front-rear-locked four wheel drive mode wherein said braking unit is fully activated so as to develop sufficient braking torque to lock said rotor against rotation, (b) a limited-slip-auxiliary four wheel drive mode wherein said braking unit is regulated to exert a reduced level of braking torque, below that required to lock said rotor against rotation, so as to allow a limited amount of slippage of the rotor in the braking unit whereby the proportion of motive power transmitted to the auxiliary drive wheels is caused to be substantially less than that transmitted to the main drive wheels, and (c) a two wheel drive mode wherein said braking unit is fully released so as to allow free rotation of said rotor and thus prevent any motive power from reaching the auxiliary drive wheels.

9. An interaxle drive transfer mechanism, in a vehicle of the part time four wheel drive type having a power driveshaft receiving motive power from an engine, a front driveshaft drivingly connected to a pair of front wheels and a rear driveshaft drivingly connected to a pair of rear wheels, comprising:

a first transfer mechanism comprising a first differential gear set having a first gear element rotationally coupled to the power driveshaft, a second gear element rotationally coupled to the front driveshaft, and a third gear element rotationally coupled to a rotor of a first braking unit;

a second transfer mechanism comprising a second differential gear set having a first gear element rotationally coupled to the power driveshaft, a second gear element rotationally coupled to the rear driveshaft, and a third gear element rotationally coupled to a rotor of a second braking unit, the second differential gear set having a gear ratio such that, in combination with the first differential gear set, the peripheral speed of the front wheels is caused to be substantially equal to that of the rear wheels whenever both of said rotors are locked against rotation; and controlling means adapted to enable selection of any one of the following modes while driving the vehicle:

(a) a front-rear-locked four wheel drive mode wherein said first and second braking units are fully activated so as to develop sufficient braking torque to lock each of said rotors against rotation, whereby available motive power is caused to be divided between the front wheels and the rear wheels;

(b) a main-front/limited-slip-rear four wheel drive mode wherein said first braking unit is fully activated so as to hold its rotor locked against rotation while said second braking unit is regulated to exert a reduced level of braking torque, below that required to lock its rotor against rotation, so as to allow a limited amount of rotor slippage in the second braking unit, whereby the proportion of motive power transmitted to the rear wheels is caused to be substantially less than that transmitted to the front wheels;

(c) a main-rear/limited-slip-front four wheel drive mode wherein said second braking unit is fully activated so as to hold its rotor locked against rotation while said first braking unit is regulated to exert a reduced level of braking torque, below that required to lock its rotor against rotation, so as to allow a limited amount of rotor slippage in the first braking unit, whereby the proportion of motive power transmitted to the front wheels is caused to be substantially less than that transmitted to the rear wheels;

(d) a front two wheel drive mode wherein said first braking unit is fully activated so as to hold its rotor locked against rotation while said second braking unit is released so as to allow free rotation of its rotor so as to apply all available motive power to the front wheels and none to the rear wheels; and (e) a rear two wheel drive mode wherein said second braking unit is fully activated so as to hold its rotor locked against rotation while said first braking unit is released so as to allow free rotor rotation, so as to apply all available motive power to the rear wheels and none to the front wheels.

* * * * *